Sept. 16, 1958 C. E. LOMAX 2,852,605

TELEPHONE SYSTEM SERVING BOTH REGULAR AND PAYSTATION TELEPHONES

Filed April 24, 1956 3 Sheets-Sheet 1

INVENTOR.
CLARENCE E. LOMAX
BY McWatter Olsen
ATTY

Sept. 16, 1958 C. E. LOMAX 2,852,605
TELEPHONE SYSTEM SERVING BOTH REGULAR AND PAYSTATION TELEPHONES
Filed April 24, 1956 3 Sheets-Sheet 2

INVENTOR.
CLARENCE E. LOMAX
BY Mc Walter Owen.
ATTY.

CLR TRUNK

INVENTOR.
CLARENCE E. LOMAX
BY [signature]
ATTY.

United States Patent Office 2,852,605

Patented Sept. 16, 1958

2,852,605

TELEPHONE SYSTEM SERVING BOTH REGULAR AND PAYSTATION TELEPHONES

Clarence E. Lomax, Chicago, Ill., assignor to General Telephone Laboratories, Incorporated, a corporation of Delaware Application April 24, 1956, Serial No. 580,314

6 Claims. (Cl. 179—6.3)

This invention relates in general to telephone systems serving both regular and paystation telephones and more particularly to the equipment providing such service and being common thereto.

It is a main object of the invention to provide an improved telephone system, wherein the circuit arrangement is such that regular and paystation telephones are served in a reliable, efficient and economical manner.

Another object of the invention is the provision of an improved finder-selector link adaptable for use in the system and arranged to serve both the regular and paystation telephones.

A further object of the invention is the provision of an improved combined line and recording (CLR) trunk adaptable for use with the above-mentioned link.

In accordance with the above-named objects, a feature of the invention resides in the inclusion of a release relay in the selector of the finder-selector link and operated responsive to a refund operation by a calling pay station, in case the refund takes place before a particular connection is completed, whereby the release relay subsequently causes the finder to restore and thus release the connection.

Another feature relates to means at the calling pay station operated in case battery is reversed over the particular connection, whereby the above-mentioned release relay is rendered unresponsive to subsequent refund attempts.

Still another feature relates to the use of normal post springs in the selector portion of the link operated in case the connection is of a different nature and battery is not reversed thereover, for rendering the operations of said above-mentioned release relay ineffective when it is caused to be operated by refund operations of the calling pay station, whereby the finder does not restore and the connection is maintained.

Another feature relates to the inclusion of a differential relay in the CLR trunk and operated responsive to the operation of the release relay, when a refund operation is caused by a calling pay station, for thereafter causing a visible signal at the operator's position to indicate to the operator that the refund has been made.

A further feature feature relates to the inclusion of normal post springs in the finder portion of the finder-selector link and operated only when a call originates from a particular type of station for applying a tone, indicative of the particular type of calling station, to the control conductor of the desired connection.

Still another feature relates to the inclusion of an induction coil in the CLR trunk and having its primary winding connected to the above-mentioned control conductor, wherein the above-mentioned tone is induced into the secondary winding of the induction coil and is subsequently applied to the talking conductors leading to the operator's position, responsive to the operator plugging in to answer the call, for informing the operator that the calling station is of the said particular type.

These and other objects and features of the invention will become apparent upon a further perusal of the specification and claims taken in conjunction with the accompanying drawings comprising Figs. 1–4 inclusive, which show by means of the usual diagrams a sufficient amount of the apparatus to enable the invention to be described and understood and in which:

Fig. 1 discloses a schematic representation of the circuit of a prepay telephone pay station, a block diagram representing a regular subscriber, block diagrams representing line circuits individual to the pay station and regular subscriber and a block diagram representing a finder common to both the pay station and regular subscriber.

In its preferred form, such as disclosed in the present application, a brief description of the invention will now be given.

Figures 1, 4:
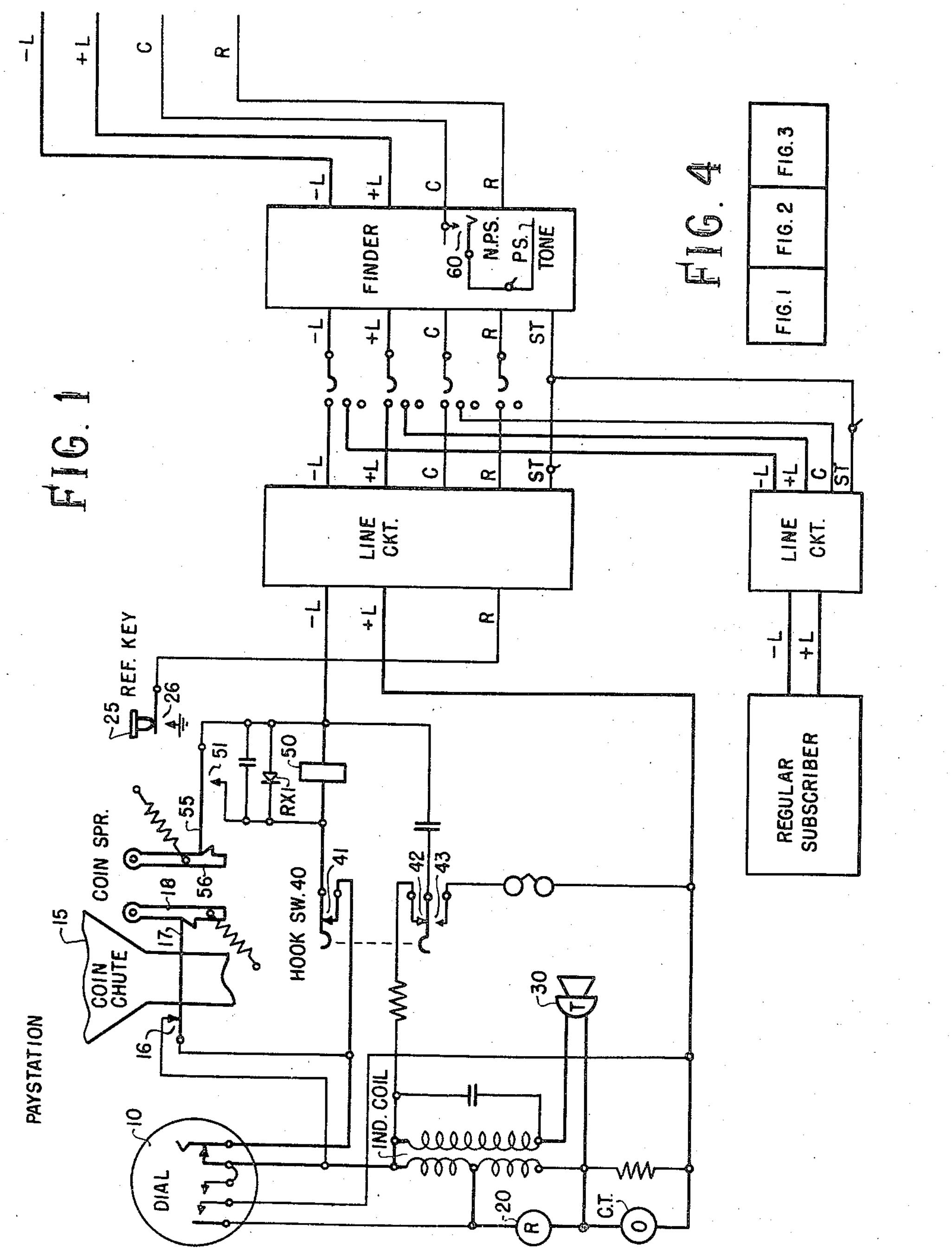
Fig. 4 is a diagram showing how the different sheets of the drawings should be arranged to properly illustrate the telephone system.

Referring in particular to the part of Fig. 1 showing the circuit arrangement of the pay station, it will be noted that this circuit is a modification of the pay station circuit disclosed in the copending application filed May 31, 1951, Serial No. 229,051 by Clarence E. Lomax, now U. S. Patent 2,750,447, issued June 12, 1956. It will further be noted that the type of mechanism used with this particular circuit arrangement is a modification of the pay station mechanism disclosed in the copending application filed December 5, 1951, Serial No. 259,961 by Hans Sengebusch, now U. S. Patent 2,735,891, issued February 21, 1956.

Briefly, the mechanism of the aforementioned Sengebusch application operates in the following manner:

The coin chute, trigger and hopper are of the conventional type, while the coin trap is operated by a lever instead of the polarized magnets which usually is the case. The dial pulsing springs are normally shunted by contacts controlled by the coin trigger and it is only after the coin trigger is operated by a deposited coin, or coins, to open these contacts that the shunt is removed in order that the calling party may operate the dial for extending the desired connection. The deposited coin is arrested and held in the hopper (not shown) by the coin trap until the call is either abandoned or answered. In case the call is abandoned and the connection is released, the refund (push) key is manually operated to move the above-mentioned lever in one direction and cause the refund of the deposit. If the call is answered, reverse battery is applied to the connection by the connector, or toll operator, to operate the coin magnet which was previously short circuited due to a rectifier shunt, to cause its armature to lock operated and allow only movement of the lever in the opposite direction. The refund key is rendered ineffective and at the completion of a call, the replacing of the handset on the hook switch operates a linkage (not shown) which moves the lever in the said opposite direction to collect the deposit and to reposition the coin trigger and polarized relay armature.

Referring briefly to the block diagrams representing the paystation and regular subscriber line circuits in Fig. 1, it will be appreciated that these line circuits may be of any well-known type adaptable for use therewith. The common finder also shown in block diagram may be of any well-known type adaptable for use by both type of subscribers. It will be noted that the finder is equipped with normal post springs, such as NPS, which operate only when the finder connects with the level, or levels, to which paystation lines are connected. These normal post springs will not operate when a regular subscriber initiates a call. Additionally, it will be noted that these finder normal post springs are arranged to connect a tone indicative only of a calling paystation to the control, or C, conductor of the particular connection.

Figure 2:
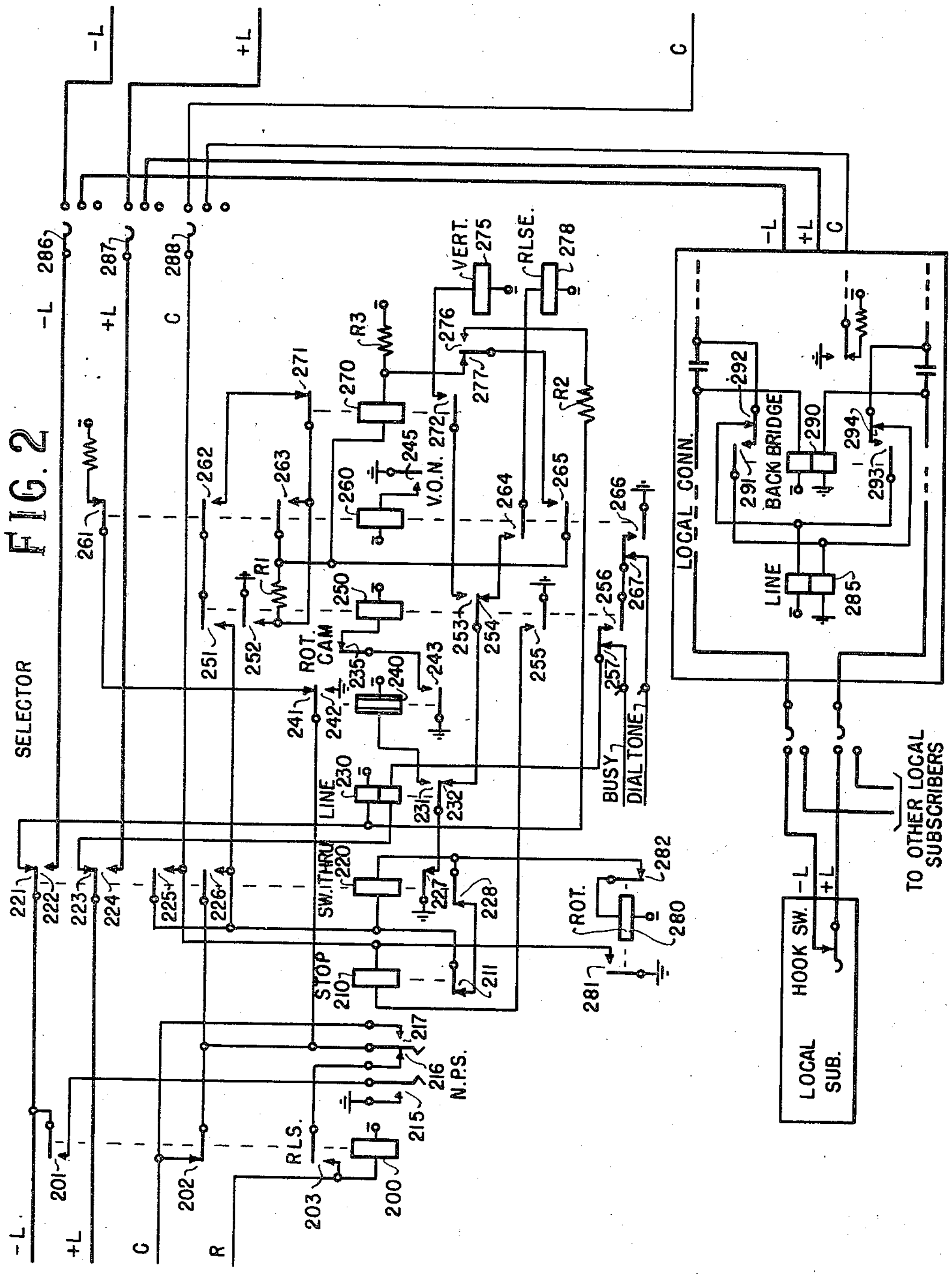
Fig. 2 shows in schematic form, the improved selector circuit and block diagrams representing a local subscriber and a local connector.

Referring to the block diagram representing the local connector shown in the lower part of Fig. 2 of the instant disclosure, it will be appreciated that this connector may be of any well-known type adaptable for use with a telephone system where the paystations included therein require reverse battery application to the talking conductors for proper operation. Only the line and backbridge relays have been shown in this block diagram, however reference may be had to U. S. Patent No. 1,889,229, granted November 29, 1932, to V. S. Tharp for a more detailed operational description of such a connector.

The improved selector disclosed in Fig. 2 is primarily intended for use as a first selector and is more commonly known as a battery searching selector, in which a stop relay is used to test for battery on an idle trunk. When this battery is found, the stop relay operates to open the rotary magnet circuit of the selector and completes a circuit for operating the switch-through relay. While a first selector ordinarily does not require a means for it to be seized by a battery searching switch, a battery searching allotter (not shown) in the finder is used in the present case to allot idle finder-selector links in a well-known manner and in the instant disclosure, the idle condition is indicated when an idle selector applies battery potential to the control, or C, conductor of the link. Therefore, a finder-selector link cannot be seized until the selector is released and idle. A special release, or R, conductor extends from the pay station to a release relay in the selector, with this conductor being grounded each time a refund operation is initiated at the pay station for operating the release relay. If the calling station is other than a pay station, use of the R conductor is discontinued, with no means being necessary to operate the release relay. If the release relay is operated as previously mentioned and the call is an unanswered local call, contacts controlled by the release relay will open the C conductor to cause the finder to restore and thus release the connection. In the event that a pay station initiates a toll call and the release relay is operated, the release relay causes the negative line to be grounded for operating additional equipment to advise the toll operator of the refund. The operation of the release relay during this last-mentioned type of call does not cause the connection to be released, such as mentioned for the local call.

Figure 3:
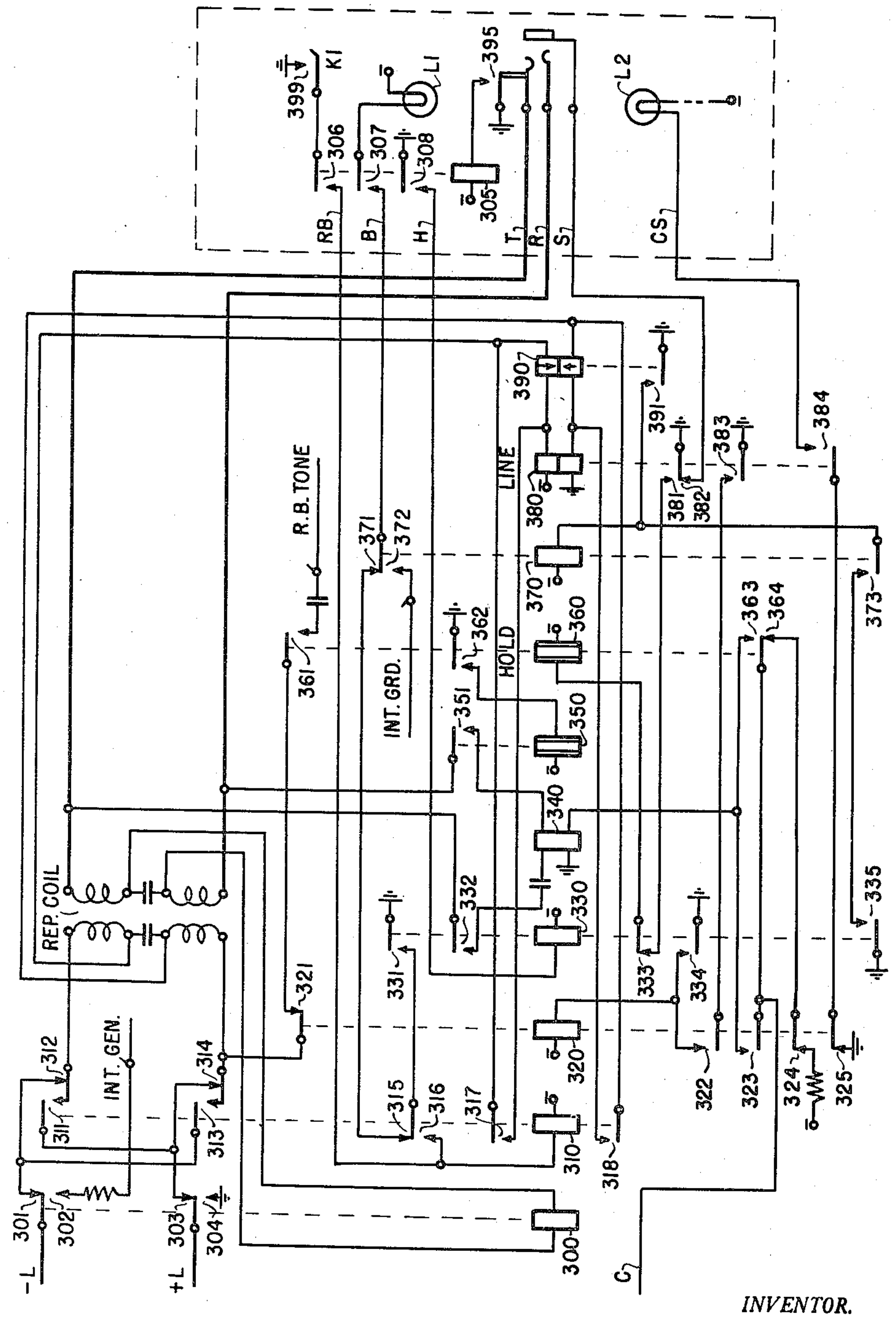
Fig. 3 shows in schematic form, the improved CLR trunk terminating in jacks and accessible by a CLR, or toll, operator.

The improved CLR trunk disclosed in Fig. 3 is arranged to serve both regular and pay station lines and terminates at a CLR operator's position. It will be remembered that as previously mentioned, when the calling line is that of a pay station, a tone individual to pay stations is placed on the C conductor of the connection by means of normal post springs in the finder. This tone is received in the primary winding of an induction coil in the CLR trunk. This tone is induced into the secondary winding of this coil and is placed upon the talking conductors of the CLR trunk leading to the operator's position, and responsive to her answering the call, the tone informs the operator that the call originated at a pay station. If there is an absence of tone, this is an indication to the operator that the call originated at a station other than a pay station. A differential relay is included in the CLR trunk and operated only in case the line conductors are unbalanced in response to an operation of the release relay in the selector, for operating means to visually inform the operator that the calling party has refunded his deposit.

A more detailed description of the invention will now follow.

Referring to the drawings represented by Figs. 1–3, inclusive, and arranged as shown in Fig. 4, it will be noted that a pay station line and a regular subscriber line are served by the same finder and selector when making calls to a local subscriber. Additionally, the same finder, selector and CLR trunk serves these lines when a toll call is made. In the ensuing detailed operational description, four different types of calls will be described, hence it is thought best to list each of them under appropriate headings relating to each particular type of call. The first of these types of calls will now be described.

*Pay station line to local subscriber*

In the ensuing operational description of the above-mentioned type of call, it will be appreciated that the calling party is using a pay station such as disclosed in Fig. 1 and will call a local subscriber such as represented in block diagram and shown in the lower portion of Fig. 2.

Referring in particular to Figs. 1 and 2, it will be assumed that the calling party at the pay station has just removed his receiver, whereby contacts 41 and 42 of hookswitch 40 are closed as shown to complete the pay station loop circuit over a well-known path from the line relay (not shown) in the pay station line circuit.

The operation of the line relay in the pay station line circuit operates in a well-known manner and completes the finder start circuit ST also in a well-known manner, thereby causing the finder to hunt for and seize the line of the calling pay station.

Immediately subsequent to the above-mentioned seizure, the pay station loop circuit is extended to the selector line relay 230 in a well-known manner and this relay is thus energized and operates. In actuating its contacts, line relay 230 completes an obvious circuit at contacts 231 for the hold relay 240 and opens a point in the pulsing circuit at contacts 232.

In actuating its contacts, hold relay 240 removes battery potential at contacts 241 from the C conductor, applies ground potential at contacts 242 to the C condutor for busying the finder-selector link and completes an obvious circuit at contacts 243 for relay 250.

In actuating its contacts, relay 250 prepares a point at contacts 251 in the circuits for rotary magnet 280 and switch-through relay 220, completes a circuit at contacts 252 for relay 270, prepares a point in the pulsing circuit at contacts 253 for vertical magnet 275, opens a point at contacts 254 in the circuit to release magnet 278, prepares a point in the circuit at contacts 255 for stop relay 210, applies dial tone at contacts 256 to the calling line in a well-known manner and removes busy tone from the calling line at contacts 257. The circuit for relay 270 may be traced from ground, through contacts 252, resistance R1, the winding of relay 270 and resistance R3 to battery.

In actuating its contacts, relay 270 opens a point in the circuits at contacts 271 for the above-mentioned rotary magnet 280 and switch-through relay 220 and prepares a point at contacts 272 in the pulsing circuit to the vertical magnet 275.

The receipt of dial tone at the pay station serves to inform the calling party of two things, namely that he must first deposit the required local fee and that he is then able to dial the first digit of the call number of the desired local subscriber.

Responsive to the first digit of the call number being dialled, line relay 230 in the selector responds to the dial pulses in a common and well-known manner. Thus, during the time that line relay 230 restores contacts 232 on each pulse, a momentary and obvious circuit is completed for operating vertical magnet 275 in a well-known manner. Hold relay 240 remains operated during pulsing, thereby also maintaining relay 250 operated.

At the same time that vertical magnet 275 operates to elevate the selector wipers 286 through 288, inclusive, it also opens contacts 277 and closes contacts 276. The opening of contacts 277 opens a point in the future shunting circuit for relay 270, while the closing of contacts 276 prepares a point in the preenergizing circuit for line relay 230. At the same time that the selector wipers are elevated off normal, vertical off normal springs (VON) 245 close to complete an obvious circuit for operating relay 260.

In actuating its contacts, relay 260 removes battery from the selector C conductor at contacts 261, prepares a point in the circuits at contacts 262 to rotary magnet 280 and switch-through relay 220, shunts resistance R1 at contacts 263 for increasing the current to relay 270 so that its release time will be increased after the first pulse and thus not restore so quickly, prepares a point at contacts 264 for release magnet 278, completes a circuit at contacts 265 for preenergizing line relay 230 and at contacts 266 and 267 applies direct ground to the +L line conductor and removes dial tone, respectively. This preenergizing circuit for line relay 230 may be traced from ground at contacts 252, contacts 263, 265, 276, high resistance R2 and through the upper winding of line relay 230 to battery. It will be noted that the value of resistance R2 is such that the current in this preenergizing circuit is insufficient to operate line relay 230, but will cause it to be extremely fast in reoperating at the end of each pulse.

Line relay 230 reoperates at the end of each pulse and opens the pulsing circuit to vertical magnet 275 at contacts 232. In restoring, vertical magnet 275 opens the aforementioned preenergizing circuit of the line relay 230 at contacts 277 and completes the previously mentioned shunting circuit of relay 270 at contacts 265. This shunt placed upon relay 270 thereby causes this relay to be slow-to-release and as such, it remains operated until the vertical magnet 275 is reoperated at the beginning of the next subsequent pulse, whereupon the shunt is removed by vertical magnet 275 and relay 270 is held operated over a previously traced circuit. Relay 270 however, will restore at the end of the dialled digit.

It will be assumed that at the end of the first dialled digit, the selector wipers have been elevated to a position opposite the bank contact level within which the conductors from the local connector are connected as shown. As relay 270 restores at the end of the first digit, a circuit is completed at contacts 271 for the rotary magnet 280 and the pulsing circuit to the vertical magnet 275 is opened at contacts 272. This circuit for rotary magnet 280 may be traced from ground through contacts 252, 271, 262, 251, 211, 228, 282 and through the winding of magnet 280 to battery. Rotary magnet 280 now operates and interrupts itself each time at its contacts 282, thereby rotating wipers 286 through 288 step-by-step over the selected level. This interaction between rotary magnet 280 and its interrupter contact 282 continues until an idle connector is found, with the idle condition of the connector being indicated in the form of a battery potential impressed on the connector C conductor. It will be appreciated that each time rotary magnet 280 operates it also closes contacts 281 which places an obvious shunt across the winding of stop relay 210. This shunt on stop relay 210 prevents a premature operation of this relay and thus prevents the selector from switching through onto a busy line, caused by the selector wipers overthrowing at times from a busy line to an idle line and then settling back to the busy line.

It will be assumed that the idle local connector such as shown is found, therefore when the selector wipers 281 through 288 connect with the bank contacts to which this connector is connected, the battery potential applied to the C conductor from the local connector completes a circuit for the selector stop relay 210 during the time that rotary magnet 280 is restored and its contacts 281 are opened. This circuit for stop relay 210 may be traced from ground at contacts 255, the winding of relay 210, the selector C conductor, wiper 288 and engaged bank contact, C conductor of the local connector and through the illustrated closed contacts and resistance to battery.

In actuating its contacts, stop relay 210 opens the shunt from around switch-through relay 220 at contacts 211, thus including the winding of relay 220 in series with the previously traced circuit of rotary magnet 280 so that relay 220 will operate. In this present circuit, only relay 220 will operate and rotary magnet 280 will not.

In actuating its contacts, switch-through relay 220 extends the connection of the talking conductors through to the local connector by way of contacts 222 and 224, opens the connection of the talking conductors at contacts 221 and 223 to the selector line relay 230, prepares a holding circuit for itself at contacts 225 over the C conductor to ground from the local connector at the time that it becomes busy, extends ground at contacts 226 back over the C conductor to the finder to thus maintain the connection, removes an operating ground at contacts 227 to allow relays 230, 240, 250 and 270 to restore and further prevents the release magnet 278 from operating during the present time to restore the selector to normal and opens a further point in the shunting circuit for itself at contacts 228 to thereby maintain this shunting circuit ineffective after the stop relay 210 has restored, which takes place either at the time of the restoration of relay 250 or at the time that the local connector returns ground back over the C conductor of the connection.

In the event that all local connectors on this particular dialled level were busy, rotary magnet 280 would continue to operate and would rotate the selector wipers off their contact banks, at which time rotary cam springs 235 would open and break the circuit to relay 250. In restoring contacts 257, relay 250 would then cause busy tone to be applied to the calling line in a well-known manner. However, since the illustrated local connector is described as being not busy and the calling subscriber is now connected therewith, the calling subscriber may thereafter proceed to dial the remaining digits of the desired local subscriber's call number to establish an effective signalling connection in a well-known manner.

After a reasonable length of time, it is assumed that the called local subscriber answers the call by removing his handset from the hookswitch, at which time the hookswitch contacts are closed as shown to complete an obvious loop circuit for operating the connector back-bridge relay 290. The operation of back-bridge relay 290 causes a reversal of the battery potential from the connector battery feed and line relay 285 as applied to the +L and −L talking conductors of the connection.

At the time that the called party answers battery is reversed to the line conductors of the connection as above-described. Rectifier RX1 at the pay station is thereupon rendered nonconductive so that coin magnet 50 is no longer short circuited thereby and therefore operates. Coin magnet 50 operates its armature 55, with this armature locking in its operated position by engaging the notch provided on the locking element 56. The operation of coin magnet 50 also operates mechanism (not shown) whereby it is position to the collect position and it is impossible for the pay station user to thereafter refund his deposit. At contacts 51, the winding of coin magnet 50 is shunted to release this magnet and thus cause it to be removed from the talking connection to maintain better transmitter efficiency. However, armature 55 will remain locked in its operated condition as above-described.

Conversation between the calling pay station and the called local subscriber may now take place, with line relay 285 and back-bridge relay 290 of the connector supplying talking battery for the pay station and called local party, respectively.

It is thought best at this time to describe the operation and function of release relay 200 before continuing further with the present description. Assuming for the present that the pay station user has made the necessary deposit and that the extension of the call may be in any stage of its progress with the exception that he called local subscriber has not removed his receiver to answer the call; within this time, should the calling pay station decide to abandon the call or perhaps fraudulently try to obtain a free call by operating refund key 25, the following operations take place: The operation of a refund key 25 operates a mechanical linkage (not shown) to cause the deposit to be refunded and to re-position the coin trigger 17 to normal so that contacts 16 are closed for reapplying the shunt on the pulsing springs of dial 10. The operation of refund key 25 also closes contacts 26, whereby the pay station release conductor (R) is grounded to complete an obvious circuit for operating release relay 200, and which extends over the R conductor through the pay station line circuit, the finder of the engaged finder-selector link, the R conductor of the link, and through the winding of relay 200 to battery.

In actuating its contacts, relay 200 performs no useful function at contacts 201 during the present type of call, removes ground from the C conductor leading from the selector to the finder at contacts 202 and completes a circuit at contacts 203 to lock itself operated over an obvious path to ground at contacts 242.

The removal of ground from the C conductor leading to the finder causes the finder to restore in a well-known manner, thereby releasing the connection.

To continue the present description:

At the end of conversation and responsive to the calling and called parties replacing their receivers, the equipment restores in a well-known manner and is thus conditioned to handle future calls.

*Pay station line to CLR operator*

For the above-mentioned type of call it will be appreciated that the calling party is using a pay station such as disclosed in Fig. 1 and that he intends to place a call of the type requiring the services of a CLR, or toll, operator to complete the extension of the call. This operator has access to the CLR trunk at the toll operator's position such as shown in the dotted rectangle at the right hand side of Fig. 3 with this position being individual to the disclosed CLR trunk.

Reference will be had to Figs. 1–3 in describing the above-named type of call. It will be appreciated that the same equipment is taken into use and the same operations take place as described in the operational description of the section entitled "Pay Station Line to Local Subscriber" up to and including the point in the description where the first digit of the call number is dialled.

At this time it is thought advisible to explain that all the CLR trunks such as disclosed in Fig. 3 are connected to the selector bank contacts located in one particular level, or plurality of levels preferably adjacent to one another, and accessible thereto by the selector wipers such as 286 through 288. In this particular case and for one method of illustration, it is assumed that these CLR trunks are connected to the tenth, or "0," contact bank level and that they are accessible to the selector responsive to the calling party dialling the single digit "0." Therefore, the selector is stepped to the tenth vertical contact bank level responsive to dialling and subsequently starts its rotary hunting over this level in a well-known manner to search for the battery potential indicative of an idle CLR trunk.

At the time that the selector C wiper 288 engages the bank contact terminating the C conductor of the disclosed idle CLR trunk, the battery potential impressed thereon causes the selector to stop on these bank contacts and switch through in a manner such as previously described.

Assuming for the moment, that upon searching through all the contacts in the entire level and finding all the CLR trunks busy, the selector would then operate its rotary cam springs 235, thereby causing the release of relay 250 and the subsequent transmission of busy tone to the calling paystation in a well-known manner.

However as previously mentioned the disclosed CLR trunk is assumed to be idle, and as the talking conductors are further extended to the CLR trunk responsive to the selector switching through, an obvious circuit is completed by way of the paystation loop circuit for operating the trunk line relay 380.

Before continuing further with the present description, it is thought advisable to mention that as the selector wipers 286–288 arrive at the "0" level of the bank contacts in response to the calling paystation dialling the "0," the selector normal post springs (NPS) are operated and as a result, contacts 215 are closed, contacts 216 are opened and contacts 217 are closed. The function of these springs will be described in detail later on in the operational description of the present type of call.

It is also thought advisable to mention that since paystations are served only from certain finder levels and since this call has originated from a said paystation, the finder normal post springs (NPS) are operated to close contacts 60, whereby a paystation identity tone is impressed on the C conductor of the extended connection. This paystation tone performed no useful function during the type of call just described, but it will have utility during the present type of call and will be described in detail later on.

Returning now to the present description, wherein the CLR trunk line relay 380 operated responsive to the selector switching through to extend the connection of the initiated call into the CLR trunk: In actuating its contacts, line relay 380 completes an obvious circuit at contacts 381 for hold relay 360, removes ground at contacts 382 from the sleeve conductor of the jack at the operator's position, prepares a point at contacts 383 in the holding circuit of relay 320 and completes an obvious circuit at contacts 384 for steadily lighting the call signalling lamp L2 at the operator's position. The steady burning of call signalling lamp L2 serves to indicate to the operator that an incoming call is waiting to be answered.

In actuating its contacts, hold relay 360 completes a circuit at contacts 361 for applying ring-back tone to the talking conductors of the calling paystation in a well-known manner, completes an obvious circuit at contacts 362 for operating relay 350, completes both a circuit at contacts 363 for holding the selector switch-through relay 220 operated and prepares a circuit for the application of the paystation identity tone to the lower winding of induction coil 340 and removes the battery potential at contacts 364 from the trunk C conductor. This holding circuit for switch-through relay 220 may be traced from ground through the primary winding of induction coil 340, contacts 363, trunk C conductor, bank contact engaged by C wiper 288, selector C conductor, contacts 225, winding of switch-through relay 220, contacts 282 and through the winding of rotary magnet 280 to battery.

In actuating its contacts, relay 350 prepares a point at contacts 351 in the circuit for the application of the paystation tone to the talking conductors leading to the operator's position.

Upon observing the steady burning of call signalling lamp L2, the operator plugs in to answer the call in a well-known manner. Responsive to the plugging in, relay 305 is operated from ground over contacts 395 in a well-known manner.

In actuating its contacts, relay 305 prepares a point in the circuit at contacts 306 for battery reversing relay 310, prepares a point in the circuit at contacts 307 for the call answer lamp L1, and completes an obvious circuit at contacts 308 for operating relay 330.

In actuating its contacts, relay 330 completes a circuit at contacts 331 for steadily lighting the call answer lamp L1, completes a circuit at contacts 332 for applying the paystation tone to the tip and ring conductors leading to the operator's position, opens the circuit at contacts 333 to hold relay 360, completes an obvious circuit at contacts 334 for operating relay 320 and prepares a point at contacts 335 in the circuit for relay 370. The circuit for call answer lamp L1 may be traced from ground at contacts 331, 315, 371, 307 and through the filament of lamp L1 to battery. The circuit for the application of paystation tone to the primary winding of induction coil 340 may be traced as extending from the paystation tone source in the finder of Fig. 1, NPS contacts 60, the C conductor leading from the finder to the selector, contacts 202, 226, 225, the selector C conductor, C wiper 288 and engaged bank contact, the trunk C conductor, contacts 363 and through the primary winding of induction coil 340 to ground. This paystation tone is induced into the secondary winding of induction coil 340 and is thereafter transmitted over conductors leading to the tip and ring conductors at the operator's position by means of contacts 332 and 351 respectively. This tone is then picked up in the operator's head set to inform her that a paystation has originated the call.

Since relay 360 is constructed as being slow-to-release, it will remain operated until after relay 320 has operated. In actuating its contacts, relay 320 removes ring-back tone from the calling line at contacts 321, completes its own locking circuit at contacts 322 to grounded contacts 383 of line relay 380, provides an obvious alternate circuit path at contacts 323 for grounding the C conductor of the connection and for the application of the pay station tone, opens another point at contacts 324 in the removal of battery potential from the C conductor and removes ground at contacts 325 to extinguish the call signal lamp L2.

Relay 360 restores at this point with no effect on the connection except to open the circuit at contacts 362 to relay 350. Due to its slow-to-release characteristics, relay 350 restores after an interval of time and opens the circuit at contacts 351 to remove the application of paystation tone to the operator's position.

At this stage of the description, the operator requests the necessary information from the calling party to establish the desired toll call and further requests that the calling party refund the initial deposit that was made in order for him to dial and establish the present connection. The calling party depresses his refund key 25 to cause the refund operation. The operation of refund key 25 causes the R conductor to be grounded for operating release relay 200 as previously described. However, relay 200 is only momentarily operated and does not lock operated over its contacts 203 as described before, nor does relay 200 open the C conductor of the finder-selector link since its contacts 202 are shunted during this type of call by NPS contacts 217. The closing of contacts 201 by relay 200 are effective during this type of call for grounding the –L line conductor of the connection, whereby the line becomes momentarily unbalanced and also the current strength through the windings of differential relay 390 in the CLR trunk. Relay 390 is therefore momentarily operated responsive to this unbalancing of current strength and in actuating its contacts 391 completes an obvious circuit for operating relay 370.

In actuating its contacts, relay 370 opens a circuit at contacts 371 for extinguishing the steady burning of call answer lamp L1, completes an obvious circuit at contacts 372 for causing interrupted ground to now flash the call answer lamp L1 and completes its own obvious locking circuit at contacts 373 to the grounded contacts 335.

This flashing of call answer lamp L1 serves to indicate to the operator that the calling paystation has refunded his deposit and also informs her that she should momentarily withdraw her plug to cause the removal of interrupted ground from lamp L1.

The momentary removal of the operator's plug allows relay 305 to restore, which then opens the circuit to cause relay 330 to restore and this relay in turn opens the circuit to cause relay 370 to restore. Relays 360 and 350 may reoperate at this time in the same manner as previously described, but to no effect and they will again restore since the operator re-inserts her plug to cause the subsequent reoperation of relays 305 and 330.

The equipment is now in condition for the operator to establish the toll call, at which time the calling party at the paystation is requested to deposit the proper toll fee. Upon making sure that the proper fee has been deposited and that the connection between the calling and called party is established, the operator then momentarily depresses key K1, which at contacts 399 completes an obvious circuit for operating relay 310.

In actuating its contacts, relay 310 reverses the polarity of battery connections from the line relay 380 to the –L and +L talking conductors by way of contacts 311 through 314 inclusive, opens the circuit at contacts 315 to extinguish the steady burning of lamp L1, completes its own obvious locking circuit at contacts 316 and shunts both the upper and lower windings of differential relay 390 at contacts 317 and 318 respectively to remove this relay from the line and thus improve the transmitter efficiency. The reversal of battery is received at the paystation and causes polarized relay 50 to operate in the same manner as previously described and operate mechanism to place it in the collect position to effect the subsequent collection of the deposit. The extinguishing of lamp L1 serves to indicate to the operator that battery has been reversed to the calling line and that the paystation is in the collect position.

Conversation may now take place over the established connection, with line relay 380 of the CLR trunk providing talking battery for the calling party and the line relay of the connector (not shown) associated with the called party, providing talking battery therefor.

The release of the illustrated equipment during the present type of call is under direct control of the operator. Namely, if the party at the paystation were to replace his receiver at the end of conversation, only line relay 380 would restore and the connection would still be maintained by relay 320 which is held operated by relay 330. Relay 330 in turn is maintained operated by relay 305, which is under direct control of the operator's plug.

The above arrangement is necessary in order for the operator to obtain the proper toll charges in case there may be a necessity for a subsequent overtime toll deposit. In another case, if the party desired by the calling party is not available at that moment, the calling party may replace his receiver and later be signalled by the operator when the connection is ready. In the case of either of the above-mentioned arrangements, the method of initiating the signalling of the calling party may be in any well-known manner, in which any well-known means under control of the operator is momentarily operated to cause the temporary operation of the recall relay 300. Contacts 301 and 303 are opened by relay 300 to open the line conductors in the CLR trunk with no apparent effect at this time other than to temporarily allow line relay 380 to restore. The closing of contacts 302 and 304 by relay 300 applies ringing current to the connection in a well-known manner to operate the ringer at the paystation. Recall relay 300 thereafter restores and causes the line conductors of the CLR trunk to be reconnected to the connection, with the subsequent reoperation of line relay 380. The calling party at the paystation removes his receiver to answer the operator's signal and his talking connection with the desired party is consequently established.

Before continuing to the next operational description, it is thought advisable to point out that should the calling party at the paystation decide to abandon the call or refund his deposit at any time prior to the operator plugging in to answer, release relay 200 will be operated responsive to the operation of refund key 25 as previously described which causes differential relay 390 to operate. The operation of differential relay 390 will thereafter complete a circuit to operate relay 370 and cause the subsequent flashing of lamp L1 to indicate to the operator that the call originated from a paystation and that he had refunded his deposit.

As previously mentioned, the operator has direct control of releasing the connection. Therefore, when the operator has received a disconnect signal in any well-known manner, responsive to the calling and called parties replacing their receivers and is assured that there are no additional charges, she removes her plug and thus causes the release of relay 305 which in turn opens the circuit to relay 330. Relay 330 then opens the circuits to relays 310 and 320 to completely restore the equipment so that it is conditioned to handle future calls.

*Regular line to local subscriber*

During the description of the above-mentioned type of call it will be assumed that the calling party is a regular, or non-paystation, subscriber calling from any well-known type of telephone having all the usual and well-known instrumentalities, with said subscriber station being represented in block diagram such as shown in the lower part of Fig. 1. It will also be assumed that the called party is a local subscriber station such as represented in block diagram and shown in the lower part of Fig. 2.

Referring in particular to Figs. 1 and 2, it will be assumed that the calling regular subscriber has just removed his receiver (not shown) to complete his loop circuit for initiating the extension of the above-mentioned type of call. The finder is started in a well-known manner thereby causing it to hunt for and seize the line of the calling subscriber. Responsive to seizure, dial tone is returned to the calling line in a well-known manner.

The receipt of dial tone serves to indicate to the calling subscriber that dialing may be started. The first digit of the call number of the desired local subscriber is now dialled, with the finder selector link functioning in the same manner as previously described in the section entitled "Paystation Line to Local Subscriber," with the finder-selector link functioning to establish a connection with the local connector such as shown. Responsive to the finder-selector link switching through to connect with the local connector, the remaining digits of the call number are then dialled to establish the signalling connection with the desired local subscriber.

Assuming for the moment that either the call is to be abandoned or the called local subscriber is busy, the equipment will restore to normal in a well-known manner responsive to the calling party replacing his receiver to open the loop circuit.

It will be noted at this time that the calling regular subscriber has no utility for an R conductor and as such can not operate the release relay such as 200. Additionally, since the finder NPS springs are only operated on finder levels serving paystations these springs will not be used when a regular subscriber initiates a call.

Continuing now to the present call, it is assumed that the call is not abandoned and that the called local subscriber is not busy. When the called party answers the call after a reasonable length of time, the removal of his handset closes his hookswitch contacts, such as shown, to cause the local connector to operate and reverse the polarity of the battery potential applied to the line conductors of the connection in a common and well-known manner. While this battery reversal is not shown or described as having any utility during the present type of call, it may be used to operate equipment (not shown) in a well-known manner to provide metering service (not shown).

No further operations take place and conversation between the calling party and called party may be held in a normal manner with the line relay 285 of the local connector supplying talking battery for the calling subscriber and back-bridge relay 290 of the local connector supplying talking battery for the called subscriber.

At the end of conversation and responsive to the calling and called parties replacing their receivers the equipment is restored in a well-known manner and conditioned to handle future calls.

*Regular line to CLR operator*

For the above-mentioned type of call it will be assumed that the calling party is the regular subscriber such as described in the section entitled "Regular Line to Local Subscriber" and that for this type of call he intends to place a call requiring the services of a CLR, or toll, operator such as described in the section entitled "Paystation Line to CLR Operator."

Reference will be had with Figs. 1–3, inclusive, during the time that the above-mentioned type of call is described and is in progress. It will be noted that the same equipment is taken into use and the same operations take place as covered in the previously described sections up to and including the dialling of the first digit "0." As previously described, the selector hunts for and connects with the first idle CLR trunk, which for the purposes of the present description we will assume to be the one shown in Fig. 3.

The equipment in the CLR trunk operates in the same manner as described in the previous section entitled "Paystation Line to CLR Operator" with the exception, that since the finder NPS springs 60 are not closed, no tone is induced into the primary winding of induction coil 340. Also, since there is no need for the calling regular subscriber to make any kind of a coin deposit, there will be no need for any operation of differential relay 390, since this relay is only used to indicate to the operator when a refund has been made by the calling party.

The call signalling lamp L2 burns steadily as previously described to inform the operator of an incoming call and the operator answers this call in the same manner as previously described. Upon answering, the operator is informed due to the absence of tone that the call originated from a non-paystation line and establishes the connection with the desired called party in a well-known manner. After making sure that the connection with the desired party is established, the operator momentarily depresses key K1 to cause the same operations as described in the above-named section, whereby the windings of differential relay 390 are shunted to exclude this relay from the connection and improve the transmitter efficiency. The reversal of battery caused by the operation of relay 310 may be used at the calling regular subscriber's station to operate equipment such as previously described.

Conversation may now take place over the established connection, with line relay 380 of the CLR trunk providing talking battery for the calling subscriber and the line relay of the connector (not shown) associated with the called party providing talking battery therefor.

Recall of the calling party and the release of the connection is under direct control of the operator and is thought to be sufficiently described in the previous section. Therefore, at the end of conversation and when the operator has received a disconnect signal she removes her plug to cause the equipment to restore in a well-known manner and as such, it is conditioned to handle future calls.

Having described my invention what is considered new and desired to have protected by Letters Patent will be pointed out in the appended claims.

What is claimed is:

1. In a telephone system, a calling paystation line, a finder-selector link having access thereto for extending a desired connection normally comprising line conductors, means including said finder for connecting said link with said paystation line responsive to the initiation of a call thereby, a release conductor other than said line conductors also included in said connection extending from said paystation into the finder portion of said link, a release relay included in said link having its operating circuit including said release conductor, means operated responsive to a refund operation by said paystation for momentarily grounding said release conductor to momentarily complete said operating circuit of said relay, and means including contacts operated by said relay for initiating the release of said finder portion of said link, whereby said connection to said paystation line over said line conductors is no longer maintained effective.

2. In a telephone system, a calling paystation line, a finder-selector link having access thereto for extending a desired connection, means including said finder for connecting said link with said paystation line responsive to the initiation of a call thereby, a release conductor included in said connection extending from said paystation into the finder portion of said link, a release relay included in said link having its operating circuit including said release conductor, a control conductor included in said finder-selector link, means operated responsive to a refund operation by said paystation for momentarily grounding said release conductor to momentarily complete said release relay operating circuit, and release contacts operated by said release relay for opening said control conductor to initiate the release of said finder and thereby render said connection between said paystation and said link ineffective.

3. A telephone system as claimed in claim 2, including a toll operator's position for extending desired connections normally comprising line conductors, a trunk circuit accessible to said link terminating at said position, means operated in the event that said release conductor has not been momentarily grounded, for extending said connection to said operator's position over said trunk circuit, means in said link operated responsive to said connection being extended to said operator's position for shunting said release contacts, a differential relay included in said trunk circuit having its windings connected in series with the line conductors of said connection, other contacts operated by said release relay in case said release conductor is grounded after said connection is extended to said operator's position, for unbalancing the said line conductors in said connection to operate said differential relay, indicating means at said operator's position, and means including contacts controlled by said differential relay for operating said indicating means in a particular manner, thereby indicating at said operator's position that said calling paystation has effected a refund.

4. A telephone system as claimed in claim 3, including a source of a particular tone in the finder portion of said link, means also included in said finder portion for applying said tone to the said control conductor in said connection, and means including an induction coil in said trunk circuit and connected to said control conductor for applying said tone to the said line conductors of said connection leading to said operator's position, whereby said particular tone audibly informs the answering operator thereat that the said call originated at said paystation.

5. A telephone system as claimed in claim 3, including a control relay in said trunk circuit, means at said operator's position operated after said desired toll call has been further extended and completed for operating said said control relay, and means including contacts operated by said control relay for shunting the windings of said differential relay to thereby exclude said relay from said connection for increasing the current flow therein.

6. In a telephone system, subscriber stations of different classes, switching equipment common to said different classes of subscriber stations and having access thereto for extending desired connections normally comprising line conductors, a toll operator's position for answering and extending toll connections, a trunk circuit accessible to said switching equipment and terminating at said toll operator's position, means for connecting said switching equipment with a calling one of said subscriber stations, means for extending said connection to said operator's position over said trunk circuit, a first visual indicating means at said operator's position, means for operating said first visual indicating means to inform an operator at said position that said call is awaiting disposition, a second visual indicating means at said operator's position, means for operating said second visual indicating means in a particular manner responsive to the answering of said waiting call for informing said operator that said call has been answered, a control conductor other than said line conductors and included in said connection, a source of special tone included in said switching equipment, means for applying said special tone to said control conductor only in case a certain class of subscriber has initiated said call, means in said trunk circuit operated responsive to receipt of said special tone for applying said tone to the said line conductors of said connection leading to said operator's position, whereby said tone audibly informs the answering operator that said call originated only at said certain class subscriber station, a release relay in said switching equipment, a release conductor extending from said certain class subscriber station to said release relay, means at said certain class subscriber station operated responsive to a refund operation thereby for operating said release relay over said release conductor, means in said switching equipment controlled by said release relay for unbalancing the said line conductors of said connection, a differential relay included in said trunk circuit having its windings connected in series with the said line conductors included therein operated responsive to said unbalancing, means including contacts operated by said differential relay for reoperating said second visual indicating means in a different particular manner for informing said operator that said certain class subscriber has effected a refund, shunting means in said trunk circuit for shunting said differential relay windings, and means at said operator's position operated after said connection has been further extended and completed for operating said shunting means to exclude said relay from said completed connection and to thereby increase the current flow therein regardless of which class of subscriber has initiated the call.

References Cited in the file of this patent

UNITED STATES PATENTS

| | | |
|---|---|---|
| 2,655,558 | Kessler | Oct. 13, 1953 |
| 2,750,447 | Lomax | June 12, 1956 |